LOW POWER THIN MAGNETIC FILM

Filed Feb. 25, 1963 2 Sheets-Sheet 1

INVENTORS
THOMAS J. MATCOVICH
HENRY S. BELSON
BY J. Donald Weber, Jr.
AGENT

LOW POWER THIN MAGNETIC FILM

Filed Feb. 25, 1963 2 Sheets-Sheet 2

3,343,144

LOW POWER THIN MAGNETIC FILM

Thomas J. Matcovich, Maple Glen, and Henry S. Belson, North Hills, Pa., assignors to Sperry Rand Corporation, New York, N.Y., a corporation of Delaware Filed Feb. 25, 1963, Ser. No. 260,642
8 Claims. (Cl. 340—174)

This invention relates to thin magnetic films. More particularly, the invention relates to thin magnetic films which require only low power drive because of the reduced anisotropy field which is effected by specially shaping the thin magnetic film.

Because of the trend toward miniaturization of components used in many electronic devices including high speed electronic computers, thin magnetic films have undergone extensive study. The uses for these thin films include switching elements in logic circuits, elements in phase-locked oscillators and parametric amplifiers, and high frequency pulse transformers. In addition, the thin magnetic film has found a great deal of usage in the memory devices utilized in the electronic computers noted supra. Because of their geometry, thin magnetic films have inherent advantages over the ferrite cores which were previously used. For example, thin magnetic films may be switched in a nanosecond with fields as low as 2–3 oersteds, whereas ferrite cores require fields on the order of 100 oersteds or more in order to switch at this speed. Other advantages in the utilization of thin magnetic films may be found in the thermal conductivity thereof (whereby heating problems are negligible) and the transmission line characteristics which may be used. However, at present thin magnetic films cannot easily be made compatible with semiconductor devices because the films require drive currents on the order of 300 to 500 milliamperes. Many semiconductor devices, as for example tunnel diodes and the like, have capabilities of producing drive currents on the order of only 10 to 100 milliamperes. Therefore, in order to fully utilize the advantages of thin magnetic films it is desirable to have thin films which can be switched by drive currents in the 10–100 milliampere range.

Several methods have been suggested for reducing the magnetic thin film drive current requirements. These methods include altering (1) the geometry of the thin film circuit, (2) the film properties and (3) the film shape. Altering the circuit geometry requires compromising the circuit operation whereby certain operational characteristics are increased at the expense of reducing others. The suggestion for altering the film properties has been fully developed and the feasibility thereof is not a well known factor. Thus, the method of altering the thin film drive current requirement by shaping the film has been studied. It has been found that the shape of the magnetic film substantially influences the amount of power needed to switch a film. That is, the switching condition of a film having an anisotropy field, $H_K$, may be defined as $$H_K^{2/3}=H_L^{2/3}+H_T^{2/3}$$

where $H_T$ is the transverse field and $H_L$ is the longitudinal field. The magnitude of $H_K$ can be effectively reduced to a very low value by choosing a special shape and orientation of the thin film. In particular, an elliptical plan configuration and an ellipsoidal volumetric shape is suggested as the preferred special shape of the new film. However, virtually any elongated quasi-rectangular shape will provide similar characteristics. Moreover, a shaped thin magnetic film may also fulfill the expectations and predictions of the other suggested methods and may be used therewith.

Consequently, it is one object of this invention to provide a thin magnetic film having a specialized shape.

Another object of this invention is to provide a thin magnetic film having a specialized shape whereby the apparent magnetic anisotropy of the film is altered.

Another object of this invention is to provide thin magnetic films having an elliptical shape whereby the magnetic anisotropy is reduced such that the film requires lower drive current.

These and other objects of this invention will become more readily apparent when the following description is read in conjunction with the accompanying drawings in which.

Figure 4A:
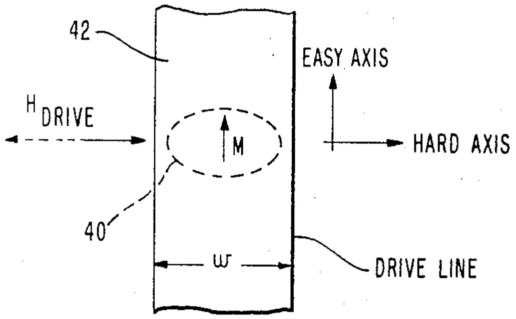
Figure 4B:
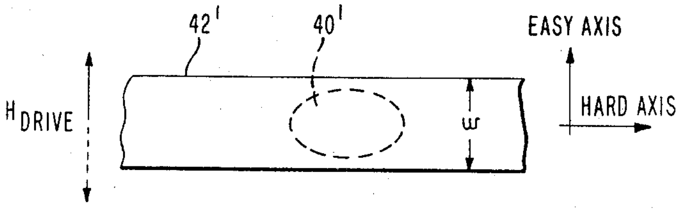
Figure 5:
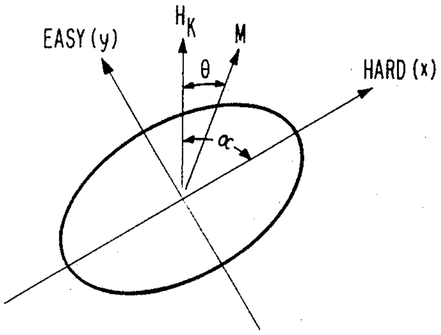

FIGURES 4*a* and 4*b* show preferred orientations of magnetic films and associated drive wires; and FIGURE 5 is another, more general, diagrammatic showing of a magnetic film having an elliptical plan configuration.

Figure 1:
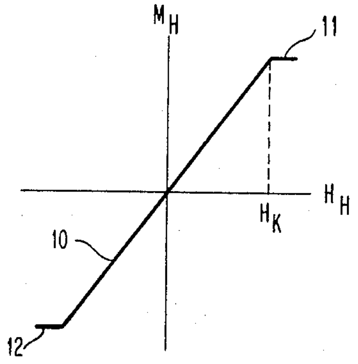
FIGURE 1 is the hysteresis characteristic observed along the HARD direction for a thin magnetic film with uniaxial anisotropy.
Figure 2:
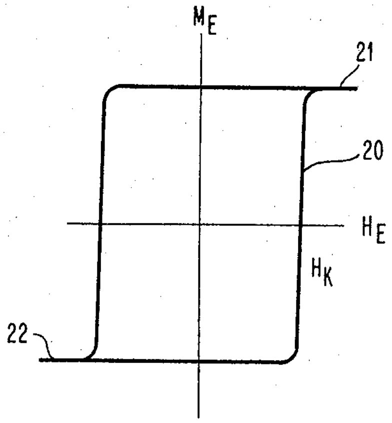
FIGURE 2 is the hysteresis characteristic observed along the EASY direction for a thin magnetic film with uniaxial anisotropy.

Referring now to FIGURES 1 and 2 concurrently, there are shown hysteresis characteristics for thin magnetic films having uniaxial magnetic anisotropy. This uniaxial anisotropy indicates that all of the magnetic moments in a particular thin magnetic film are aligned along one axis, usually called the EASY axis. The direction of the EASY axis is determined by applying an external DC magnetic field during the process of depositing the thin magnetic film upon the desired substrate. The uniaxial anisotropy can be observed by measuring the hysteresis characteristics along the EASY and HARD axes. It is understood, that the EASY and HARD axes of a thin film are mutually perpendicular to one another. In FIGURE 1, there is shown a hysteresis characteristic 10 which is observed along the HARD direction of a thin magnetic film having uniaxial anisotropy. In the coordinate system of the plot of the characteristic, the ordinate, $M_H$, represents the magnetization along the HARD axis and the abscissa $H_H$, represents the driving field in the HARD direction. This hysteresis characteristic is, in fact, a straight line having positive and negative saturation levels 11 and 12 respectively, but exhibiting no real hysteresis. In FIGURE 2, the uniaxial anisotropy is observed along the EASY direction and produces a hysteresis characteristic 20 which is, in fact, a typical open loop. In preferred embodiments, this loop is substantially rectangular and has saturation levels 21 and 22. In the coordinate system of the plot of this characteristic, the ordinate $M_E$ represents the magnetization along the EASY axis and the abscissa $H_E$, represents the driving field in the EASY direction.

The saturation mentioned supra, with regard to the hysteresis characteristics for the film when the uniaxial anisotropy is measured along either the HARD or the EASY axis of the film suggests a magnetic saturation. This magnetic saturation occurs when an externally applied field exceeds the anisotropy field ($H_K$) which is the field required to rotate the magnetization vector of the thin film from the EASY to the HARD direction. Thus, it should be clear that small values of $H_K$ are essential and desirable to provide thin magnetic films which require small drive currents.

It has been found that a thin magnetic film will exhibit a low effective anisotropy field by proper shaping of the thin film. In particular, it has been found that the demagnetization field in a thin film is reduced in the direction of the major or long axis and increased in the direction of the minor or short axis if an elliptically shaped film is used. That is, as will appear subsequently, the demagnetization effect and the anisotropy field compete or supplement insofar as the effect exerted on the thin film is concerned. Therefore, the thin magnetic film shown in FIGURE 3 has a suggested shape which is preferable and which will produce a reduction in the effective anisotropy field. The preferred shape is elliptical and has a major axis $a$ and a minor axis $b$.

That the shaping of a thin film is effective to lower the anisotropy field may be shown by depositing a film so that its EASY direction is perpendicular to the long dimension of the elliptical or substantially rectangular film. This may be controlled by applying a magnetic field to the device during the deposition of the film. In this condition, the magnetization vector M tends to be aligned along the EASY axis. However, as noted, the film has a preferred shape. Because of the shape of the film, the magnetization vector, M, tends to be aligned along the longer or HARD axis of the film. In other words, the shape anisotropy (which is effected by the demagnetizing effect) is competing with the induced or intrinsic uniaxial anisotropy. The shape anisotropy does not significantly alter the alignment of the originally induced EASY direction until a critical elliptical shape is produced for the film (see infra). However, the shape anisotropy does lower the total anisotropy energy and it does give a lower effective anisotropy field.

Figure 3:
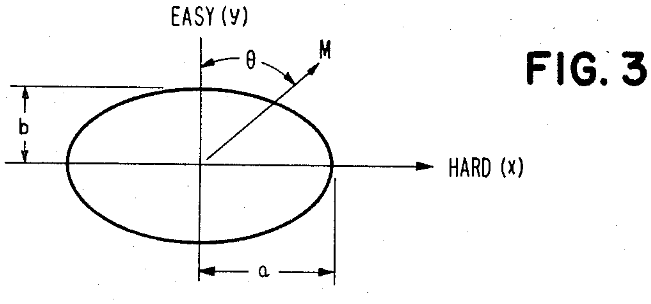
FIGURE 3 is one diagrammatic showing of a magnetic film having an elliptical plan configuration.

This can be shown by considering the elliptically shaped film shown in FIGURE 3. The results should be approximately correct even for a rectangle. The simplest case is an ellipse with its major axis aligned perpendicular to the uniaxial anisotropy axis, but it can be shown that the concept is not so limited. The energy equation for this shape is $$E=K\sin^2\theta+\tfrac{1}{2}N_xM_x^2+\tfrac{1}{2}N_yM_y^2$$

where $N_x$ and $N_y$ are the demagnetization constants in the $x$ and $y$ directions and E is the potential energy associated with a rotation of the magnetic moment. If $\theta$ is the angle between the EASY ($y$) axis and the magnetization vector (M), then $$M_x=M\sin\theta$$
$$M_y=M\cos\theta$$

and $$E=K\sin^2\theta+\tfrac{1}{2}N_xM^2\sin^2\theta+\tfrac{1}{2}N_y(1-\sin^2\theta)M^2$$
$$=\tfrac{1}{2}N_yM^2+\left[K+\frac{M^2(N_x-N_y)}{2}\right]\sin^2\theta$$

The constant term ($\tfrac{1}{2}N_yM^2$) can be ignored since, in this consideration, only the change in energy with angle is important. The new energy is just that of a circular film with $$E=K'\sin^2\theta$$

where $$K'=K+\frac{N_x-N_y}{2}M^2$$

Since the anisotropy field is defined as $H_k=2K/M$, then $$H_k'=H_k+(N_x-N_y)M$$

where $H_k'$ is the modified or effective anisotropy field of the film which is produced by the combination of the anisotropy field $H_k$ and the demagnetization effect $(N_x-N_y)M$.

Thus, elongating a magnetic film will effectively decrease the effective anisotropy field, $H_k'$, since $N_y$ is greater than $N_x$. The magnitude of the decrease in anisotropy field depends on the ratio $b/a$ and on the ratio $c/a$ (where $c$ is the thickness of the film and $a$ and $b$ are the minor and major axes respectively). The dependence of the demagnetization factors on shape can be seen in Table 1.

TABLE 1

| b/a | $N_x$ | $N_y$ |
|---|---|---|
| 1.00 | 9.1 c/a | 9.1 c/a |
| 0.50 | 7.5 c/a | 20 c/a |
| 0.33 | 6.0 c/a | 33.6 c/a |
| 0.20 | 4.5 c/a | 84 c/a |
| 0.10 | 2.5 c/a | 189 c/a |

For a typical thin film $M=800$ and $c/a=2\times10^{-5}$. Then, if $b/a$ is 0.1, $$(N_x-N_y)M=-3\text{ oe.}$$

In other words, the apparent anisotropy can be decreased by 3 oersteds in this particular case if the shape is made quite elliptical.

The theoretical reductions in $H_k$ which can be achieved for two sizes of films are summarized in Table 2. Here $c/a$ values are $2\times10^{-5}$ (2000 angstroms thick, 1 cm. diameter film) and $8\times10^{-5}$ (1000 angstroms thick, 50 mil diameter film).

TABLE 2

| b/a | 2,000 A., 1 cm. | 1,000 A., 50 mil. |
|---|---|---|
| | $c/a=2\times10^{-5}$ | $c/a=8\times10^{-5}$ |
| 1.00 | 0 oe. | 0 oe. |
| .50 | −0.2 | −0.8 |
| .33 | −0.44 | −1.76 |
| .20 | −1.28 | −5.2 |
| .10 | −3 | −12 |

Possible orientations of the magnetic film and the associated drive wire are shown by FIGURES 4*a* and 4*b* and described by making reference thereto. In the preferred orientation the drive wire 42 must always be oriented parallel to the EASY direction of the film 40 in order to provide a magnetic drive field, $H_D$, perpendicular to the magnetization vector, M. If the magnetization, M, is oriented along the minor or short axis, $b$, of the elliptical film, as shown in FIGURE 4*a*, then $w$, the width of the drive line or wire 42 must be equal to the major axis of the ellipse while the long dimension of the wire 42 extends parallel to the short axis, $b$, whereby the field, $H_D$, is perpendicular to the magnetization vector, M. This orientation will then give a lower drive field since $a>b$. However, if a critical shape having severe eccentricity is chosen for the film 40', the EASY direction may be changed from the minor to the major axis because the shape anisotropy overcomes the demagnetization effect. In this condition the drive wire 42' will be parallel to the long dimension of the ellipse. Thus, the ideal film element, from the viewpoint of lowered power requirements, is an elliptical film which is deposited in a magnetic field oriented along the minor axis but so shaped that the resultant EASY direction is along the major axis.

Referring now to FIGURE 5, the more general case is considered. In this case, the $x$ direction of the ellipse is aligned at an arbitrary angle $\alpha$ to the $H_k$ direction. The energy equation now becomes:

$$E=K\sin^2\theta+\tfrac{1}{2}N\times M^2\cos^2(\alpha-\theta)+\tfrac{1}{2}N_yM^2\sin^2(\alpha-\theta)$$

Using trigonometric identities and dropping the constant terms this equation can be rewritten:

$$E=-\frac{K}{2}\cos 2\theta+\frac{N_y-N_x}{4}M^2\cos(2\alpha-2\theta)$$

Again using trigonometric identities this may be rewritten $$E=A\sin^2\phi$$

where $$A=\frac{M}{2}[H_k^2+2H_k(N_x-N_y)M\cos 2\alpha+(N_x-N_y)^2M^2]^{1/2}$$

$$\phi=2\theta+\beta$$

$$\beta=\sin^{-1}\frac{(N_x-N_y)M^2\sin 2\alpha}{8A}$$

From these equations, it can then be concluded that, in general, a $\sin^2\phi$ energy behavior may be obtained, regardless of the orientation or axial ratio of the ellipse. The magnitude of the apparent anisotropy constant is given by A, and the apparent new EASY direction will be at $-\beta/2$. Accordingly, the magnitude and direction of $H_k'$ of a given thin film may be adjusted, as for example by etching or the like.

It has been shown that an elliptically shaped thin film has distinct advantages especially in regard to the drive power required. In order to use the film, typical thin film circuit geometry comprising a plurality of etched or deposited layers may be utilized. This and other production concepts are known in the art and are not critical to the instant invention. Of course, various schemes may be suggested for utilization of the novel film described supra. However, the applications of the film are not described here. Moreover, the inventive principles described do not depend upon the systems used but rather rely solely on the concept of selectively shaping thin magnetic films in order to achieve desired results.

The embodiments of the invention in which an exclusive property or privilege is claimed are defined as follows:

1. A thin magnetic film having an elongated surface configuration including a major and a minor axis and an EASY and HARD direction of magnetization, said EASY direction being aligned with one said axes in such a manner that said film has the property of a relatively low magnetic anisotropy, a drive line juxtaposed to said film along said EASY direction whose width dimension is at least equal to the dimension of said film in the HARD axis direction whereby the drive current requirements of said film are reduced.

2. A thin magnetic film having an elongated configuration and having an EASY direction aligned with the minor axis of said configuration, whereby the film's drive current requirements are reduced.

3. A thin magnetic film having an elongated configuration including a major and a minor axis and an EASY and HARD direction of magnetization, said EASY direction being aligned with one of said axes wherein said film has the property that the shape anisotropy and the intrinsic anisotropy compete in order to reduce the film's intrinsic anisotropy, a drive line juxtaposed to said film along said EASY direction whose width dimension is at least equal to the dimension of said film in the HARD axis direction, whereby the film's drive current requirements are reduced.

4. A thin magnetic film having an elliptical, flat surface configuration and having its EASY direction aligned with the minor axis of said configuration.

5. A thin magnetic film having an elliptical, flat surface configuration and having its EASY direction aligned with the major axis of said configuration.

6. A thin magnetic film having an elongated surface configuration including a major and a minor axis and an EASY and HARD direction of magnetization, and having said EASY direction aligned with one of said axes, the demagnetizing characteristics of said film causing the drive current requirements thereof to be reduced because of said configuration such that said film may be switched more easily.

7. A thin magnetic film, said film having HARD and EASY directions of magnetization and being characterized by uniaxial anisotropy, said film having an elliptical plan configuration with said HARD and EASY directions aligned along the major and minor axes of the film, respectively, said film generating a demagnetizing field because of said elliptical configuration such that the anisotropy of said film is reduced and the driving force required to switch said film is reduced.

8. A thin magnetic film having an elongated configuration and having an EASY direction aligned with the minor axis of said configuration, means for mounting said thin film, a drive line juxtaposed to said film to selectively apply drive signals thereto for the purpose of switching said film, said film having the anisotropy field thereof controlled in accordance with $H_K'=H_K+(N_X-N_Y)M$ where $H_K'$ is the effective anisotropy field,
$H_K$ is the anisotropy field and
$(N_X-N_Y)M$ is the demagnetizing effect wherein,
$N_X$ is the demagnetizing constant in the X direction,
$N_Y$ is the demagnetizing constant in the Y direction,
M is the magnetization vector and wherein $H_K'$ is an algebraic addition of the components.

References Cited

UNITED STATES PATENTS

| | | | |
|---|---|---|---|
| 3,030,612 | 4/1962 | Rubens et al. | 340—174 |
| 3,059,538 | 10/1962 | Sherwood et al. | 340—174 |

OTHER REFERENCES

IBM Technical Disclosure Bulletin, "Restraint Domain Nucleation in Thin Magnetic Films," vol. 3, No. 10, March 1961, p. 102 relied on.

BERNARD KONICK, *Primary Examiner.*

JOHN BURNS, JAMES W. MOFFITT, *Examiners.*

G. HARRIS, S. URYNOWICZ, *Assistant Examiners.*